US010108077B2

(12) United States Patent
Hama et al.

(10) Patent No.: US 10,108,077 B2
(45) Date of Patent: Oct. 23, 2018

(54) LIGHT SOURCE APPARATUS AND PROJECTOR

(71) Applicant: SEIKO EPSON CORPORATION, Tokyo (JP)

(72) Inventors: Katsumitsu Hama, Matsumoto (JP); Tomohiro Takagi, Azumino (JP); Yuta Ito, Azumino (JP); Takayuki Matsubara, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/879,842

(22) Filed: Jan. 25, 2018

(65) Prior Publication Data

US 2018/0217481 A1  Aug. 2, 2018

(30) Foreign Application Priority Data

Feb. 1, 2017  (JP) .................................. 2017-016875

(51) Int. Cl.
*G03B 21/20* (2006.01)
*G03B 21/16* (2006.01)
(Continued)

(52) U.S. Cl.
CPC ........... *G03B 21/204* (2013.01); *G03B 21/16* (2013.01); *G03B 21/208* (2013.01);
(Continued)

(58) Field of Classification Search
CPC ............................ G03B 21/204; G03B 21/208; G03B 21/2013; G03B 21/2033; G03B 21/2066; H04N 9/3111; H04N 9/3114; H04N 9/3152; H04N 9/31161; H04N 9/3164; H04N 9/3197
See application file for complete search history.

(56) References Cited

U.S. PATENT DOCUMENTS 8,678,596 B2   3/2014  Sakata et al.
8,733,940 B2   5/2014  Tanaka et al.
(Continued)

FOREIGN PATENT DOCUMENTS

JP   2011-197212 A   10/2011
JP   2012-137744 A    7/2012
JP   2015-106130 A    6/2015

*Primary Examiner* — Sultan Chowdhury
(74) *Attorney, Agent, or Firm* — Oliff PLC

(57) ABSTRACT

A light source apparatus includes a first light source section that outputs blue light along a first illumination optical axis, the second light source section are arranged side by side and outputs excitation light along a second illumination optical axis substantially parallel to the first illumination optical axis, a reflection member that reflects the excitation light in such a way that the reflected excitation light travels along a third illumination optical axis that intersects the first illumination optical axis and the second illumination optical axis, a wavelength converter on which reflects converted light having a wavelength different from a wavelength of the excitation light, and a light combiner that is located in the position where the first illumination optical axis and the third illumination optical axis intersect each other and transmits the blue light and the excitation light but reflects the converted light.

20 Claims, 4 Drawing Sheets

(51) Int. Cl.
 *G03B 33/12* (2006.01)
 *G03B 21/00* (2006.01)

(52) U.S. Cl.
 CPC ..... *G03B 21/2013* (2013.01); *G03B 21/2066* (2013.01); *G03B 21/006* (2013.01); *G03B 33/12* (2013.01)

(56) References Cited

U.S. PATENT DOCUMENTS

| | | |
|---|---|---|
| 9,323,045 B2 | 4/2016 | Sakata et al. |
| 9,429,831 B2 | 8/2016 | Akiyama |
| 2011/0228232 A1 | 9/2011 | Sakata et al. |
| 2012/0140183 A1 | 6/2012 | Tanaka et al. |
| 2014/0152964 A1 | 6/2014 | Sakata et al. |
| 2015/0153020 A1 | 6/2015 | Akiyama |
| 2016/0026076 A1* | 1/2016 | Hu ................. G03B 21/204 353/84 |
| 2016/0088273 A1* | 3/2016 | Fukui .............. G03B 21/204 353/31 |

\* cited by examiner

LIGHT SOURCE APPARATUS AND PROJECTOR

BACKGROUND

1. Technical Field

The present invention relates to a light source apparatus and a projector.

2. Related Art

As alight source apparatus employed in a projector, there has been a known light source apparatus that outputs white light containing blue light and fluorescence (yellow light) (see JP-A-2012-137744, for example).

In the light source apparatus described in JP-A-2012-137744, blue light outputted from a solid-state light source unit is reduced in diameter by two lenses, then diffused by a diffusing plate so that uniform in-plane illuminance of the blue light is achieved, and incident on a half-wave plate. The optical axis of the half-wave plate is so adjusted that 90 to 70% of the blue light incident on the half-wave plate is converted into s-polarized component and to 30% of the incident blue light is converted into p-polarized component. The blue light having passed through the thus configured half-wave plate is incident on a dichroic mirror.

The dichroic mirror not only reflects the s-polarized component of the blue light and transmits the p-polarized component thereof but transmits green light and red light. That is, the dichroic mirror described in JP-A-2012-137744 has a wavelength selective polarization separation characteristic. Out of the blue light having passed through the half-wave plate and impinged on the dichroic mirror, the s-polarized component is reflected off the dichroic mirror toward a fluorescence emitting plate, and the p-polarized component passes through the dichroic mirror toward a polarization direction converter.

The s-polarized component reflected toward the fluorescence emitting plate is collected by a condenser lens and incident on the fluorescence emitting plate, and the fluorescence described above is emitted from the fluorescence emitting plate. The fluorescence is collected and parallelized by the condenser lens described above and passes through the dichroic mirror described above.

On the other hand, the p-polarized component having passed toward the polarization direction converter is converted by a quarter-wave plate and a reflection plate into the s-polarized component and reflected off the dichroic mirror in the direction in which the fluorescence described above travels.

The white light containing the fluorescence and the blue light is thus outputted from the light source apparatus.

In the light source apparatus described in aforementioned JP-A-2012-137744, however, the length of the optical path from the solid-state light source unit to the fluorescence emitting plate, which is a wavelength converter, (L-letter-shaped optical path) is equal to the length of the optical path from the solid-state light source unit to the reflection plate. The size of the light source apparatus is therefore undesirably likely to increase. In contrast, it is conceivable to reduce the size of the light source apparatus by shortening the length of the optical path from the solid-state light source unit to the wavelength converter with the length of the optical path from the solid-state light source unit to the reflection plate maintained.

Shortening the length of the optical path from the solid-state light source unit to the wavelength converter, however, makes it difficult for the condenser lens described above and other components to sufficiently reduce the diameter of the blue light incident on the fluorescence emitting plate. In this case, the amount of fluorescence diffusively outputted from the fluorescence emitting plate and incident on the condenser lens decreases, and the amount of light outputted from the light source apparatus undesirably tends to decrease.

SUMMARY

An advantage of some aspects of the invention is to provide a light source apparatus and a projector that allow size reduction thereof and have a relatively long optical path of light incident on a wavelength converter.

A light source apparatus according to a first aspect of the invention includes a first light source section that outputs blue light along a first illumination optical axis, a second light source section that is so disposed that the first light source section and the second light source section are arranged side by side and outputs excitation light along a second illumination optical axis substantially parallel to the first illumination optical axis, a reflection member that reflects the excitation light outputted from the second light source section in such a way that the reflected excitation light travels along a third illumination optical axis that intersects the first illumination optical axis and the second illumination optical axis, a wavelength converter on which the excitation light reflected off the reflection member is incident after the excitation light intersects the first illumination optical axis and which causes converted light having a wavelength different from a wavelength of the excitation light to exit in a direction opposite a direction in which the excitation light is incident, and a light combiner that is located in a position where the first illumination optical axis and the third illumination optical axis intersect each other and transmits the blue light and the excitation light but reflects the converted light in such way that the reflected, converted light travels along the first illumination optical axis.

According to the first aspect described above, the blue light and the excitation light outputted from the first light source section and the second light source section travel along the first illumination optical axis and the second illumination optical axis, which are substantially parallel to each other, respectively. Out of the two light fluxes, the excitation light is reflected off the reflection member, travels along the third illumination optical axis, which intersects the first illumination optical axis described above, and is incident on the wavelength converter. Since the configuration described above allows the optical path of the excitation light to be longer than the optical path of the blue light, an optical part can, for example, be disposed to readily reduce the light flux diameter of the excitation light, whereby the converted light can be readily incident on the light combiner. Further, since the first light source section and the second light source section are arranged side by side, so that the second light source section is not shifted with respect to the first light source section in the direction in which the blue light and the excitation light exit, and the excitation light does not travel straight only in one direction, unlike the blue light, but is reflected off the reflection member, a compact light source apparatus can be configured with the optical path length of the excitation light increased. The size of the light source apparatus can therefore be reduced.

Further, since the first light source section, which outputs the blue light, and the second light source section, which outputs the excitation light, are provided, it is not necessary to provide a retardation element (half-wave plate) that rotates the polarization direction of blue light outputted from one light source section to produce an s-polarized component and a p-polarized component. Moreover, since it is possible to separately turn on the first light source section and the second light source section, separate adjustment of the amount of each of the blue light and the excitation light does not require a pivot apparatus that causes the retardation element to pivot. Therefore, the size of the light source apparatus can be readily reduced, and the balance between the amount of the blue light and the amount of the excitation light and in turn the color balance of the light flux outputted from the light source apparatus can be readily adjusted.

In addition, a dichroic mirror or a dichroic prism that transmits the blue light and the excitation light but reflects the converted light can be employed as the light combiner. The light source apparatus can therefore have an inexpensive configuration as compared with a case where a polarization separation element is employed as the light combiner. Further, the light combiner can perform transmission and reflection of light incident thereon based not on the polarization state but on the wavelength. Therefore, even in a case where there is a change in the polarization state of the light incident on the light combiner, no change in the color balance of the light outputted from the light source apparatus occurs.

In the first aspect described above, it is preferable that the light source apparatus further includes a first lens that is disposed between the second light source section and the reflection member and collects the excitation light outputted from the second light source section, a second lens that is disposed between the reflection member and the light combiner and parallelizes the excitation light reflected off the reflection member, and an excitation light collection element that is disposed between the light combiner and the wavelength converter, collects the excitation light and causes the collected excitation light to be incident on the wavelength converter, parallelizes the converted light incident from the wavelength converter, and causes the converted light to be incident on the light combiner.

According to the configuration described above, the excitation light outputted from the second light source section can be collected by the first lens, whereby the excitation light is efficiently allowed to be incident on the wavelength converter.

The excitation light collection element collects the excitation light parallelized by the second lens described above and causes the collected excitation light to be incident on the wavelength converter. The light flux diameter of the converted light diffusively outputted from the wavelength converter can therefore be reduced. The converted light outputted from the wavelength converter can therefore be readily incident on the excitation light collection element.

Further, since the excitation light collection element parallelizes the converted light incident from the wavelength converter and causes the converted light to be incident on the light combiner, diffusion of the converted light can be avoided. The light flux diameters of the blue light and the converted light having exited via the light combiner are readily allowed to be equal to each other.

In the first aspect described above, it is preferable that the light source apparatus further includes a diffusing element that is disposed between the second lens and the light combiner and diffuses the excitation light incident on the diffusing element.

In a case where illuminance unevenness occurs in the area where the wavelength converter is illuminated with the excitation light so that excitation light having locally high illuminance is incident on the illuminated area, thermal saturation is likely to occur in the wavelength converter, resulting in a decrease in the efficiency of the wavelength conversion to the converted light and a possible reduction in the life of the wavelength converter.

In contrast, since the excitation light diffused by the diffusing element described above is collected by the excitation light collection element and incident on the wavelength converter, occurrence of illuminance unevenness in the illuminated area due to the excitation light can be avoided. Therefore, the occurrence of thermal saturation described above can be avoided, and a decrease in the efficiency of the wavelength conversion to the converted light and the reduction in the life of the wavelength converter can be avoided.

In the first aspect described above, it is preferable that the light source apparatus further includes a diffuser that is disposed between the first light source section and the light combiner and diffuses the blue light outputted from the first light source section.

In a case where the blue light outputted from the first light source section is a laser beam, a bright and dark spot pattern called speckles is observed when the laser beam is scattered. The speckles degrade the quality of an image formed by the light flux outputted from the light source apparatus.

To avoid the problem described above, the diffuser described above diffuses the blue light, whereby the speckles described above can be suppressed. The image degradation described above can therefore be suppressed.

The diffuser is not limited to a reflective diffuser that diffuses and reflects light incident thereon and may instead be a transmissive diffuser that diffuses and transmits light incident thereon. In a case where a transmissive diffuser is employed out of the two types of diffuser, an increase in the optical path length of the blue light can be suppressed, and the size of the light source apparatus can be readily reduced.

In the first aspect described above, it is preferable that the first light source section includes a plurality of solid-state light sources each of which emits the blue light, that the light source apparatus further includes a superimposing element that is disposed between the first light source section and the diffuser and superimposes the blue light fluxes emitted from the plurality of solid-state light sources on one another on the diffuser, and that the superimposing element is formed of a single lens.

According to the configuration described above, the superimposing element allows the blue light incident thereon to be efficiently incident on the diffuser, as in the case where the excitation light collection element described above is provided. Further, since the superimposing element superimposes the light fluxes emitted from the solid-state light sources on one another on the diffuser, occurrence of luminance unevenness in the diffused light outputted from the diffuser can be avoided, whereby the illuminance of the blue light outputted from the diffuser in a plane perpendicular to the center axis of the blue light can be substantially homogenized. Occurrence of illuminance unevenness in the illuminated area due to the light flux outputted from the light source apparatus can therefore be avoided, and occurrence of color unevenness in an image formed by the light flux outputted from the light source apparatus can be in turn avoided. Further, the superimposing element, which is formed of a single lens, prevents an increase in the length of the optical path of the blue light, whereby the size of the light source apparatus can be readily reduced.

In the first aspect described above, it is preferable that the light source apparatus further includes a parallelizing element that is disposed between the diffuser and the light combiner, parallelizes the blue light outputted from the diffuser, and causes the blue light to be incident on the light combiner.

When the blue light diffused by the diffuser is directly incident on the light combiner, the light flux diameter of the blue light increases as the blue light travels.

In contrast, since the parallelizing element described above parallelizes the blue light, the divergence of the blue light can be suppressed. In the case where the light source apparatus includes the excitation light collection element described above, the excitation light collection element and the parallelizing element readily allow the light flux diameters of the blue light and the converted light to be equal to each other. Therefore, in the range illuminated with the light flux outputted form the light source apparatus, the illumination range of the blue light and the illumination range of the converted light are readily allowed to be equal to each other. Therefore, in a case where a projector employs the light source apparatus, among optical parts provided in the projector, occurrence of a decrease in the illuminance and deterioration of the color balance in an optical part on which the light flux outputted from the light source apparatus is first incident can be avoided, and deterioration of the color balance and occurrence of color unevenness in an image projected by the projector can in turn be avoided.

In the first aspect described above, it is preferable that the light combiner transmits the blue light and the excitation light but reflects the converted light based on a wavelength of light incident on the light combiner.

According to the configuration described above, since a dichroic mirror or a dichroic prism can be employed as the light combiner, as described above, the light source apparatus can have an inexpensive configuration as compared with a case where a polarization separation element is employed as the light combiner. In addition, the transmission of the blue light and the excitation light and the reflection of the converted light performed by the light combiner can be performed based not on the polarization state but on the wavelength. Therefore, even in a case where there is a change in the polarization state of the light incident on the light combiner, occurrence of deterioration of the color balance of the light outputted from the light source apparatus can be avoided.

In the first aspect described above, it is preferable that the first light source section and the second light source section are disposed with a gap therebetween.

According to the configuration described above, the gap allows heat produced in one of the first light source section and the second light source section to be unlikely to be transferred to the other. An increase in the temperature of each of the first light source section and the second light source section can therefore be suppressed, whereby a decrease in output efficiency of the blue light and the excitation light can be suppressed.

In the first aspect described above, it is preferable that the light source apparatus further includes a radiator connected to the first light source section and the second light source section.

According to the configuration described above, heat generated in the first light source section and the second light source section can be dissipated by the radiator. An increases in the temperature of each of the first light source section and the second light source section can therefore be suppressed, whereby a decrease in output efficiency of the blue light and the excitation light can be suppressed. In addition, since the first light source section and the second light source section need to be provided with no radiator, an increase in the number of parts can be avoided.

In the first aspect described above, it is preferable that the first light source section includes blue solid-state light sources each of which emits the blue light, that the second light source section includes excitation solid-state light sources each of which emits the excitation light, and that the number of excitation solid-state light sources is greater than the number of blue solid-state light sources.

The excitation light is incident on the wavelength converter and converted into the converted light. In a case where the wavelength converter produces yellow light as the converted light, and the light source apparatus outputs white light, the amount of the excitation light needs to be greater than the amount of the blue light outputted by the first light source section. Further, in consideration of the efficiency of the wavelength conversion from the excitation light to the converted light performed by the wavelength converter, a still greater amount of excitation light is required.

To this end, the number of excitation solid-state light sources is greater than the number of blue solid-state light sources, whereby the second light source section can output the excitation light the amount of which is greater than the amount of the blue light outputted from the first light source section. The light source apparatus can therefore readily output the white light.

A projector according to a second aspect of the invention includes the light source apparatus described above, a light modulator that modulates light outputted from the light source apparatus, and a projection optical apparatus that projects the modulated light from the light modulator.

According to the second aspect described above, the same advantageous effects as those provided by the light source apparatus according to the first aspect described above can be provided, and the size of the projector can be in turn reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.
Schematic Configuration of Projector
FIG. 1 is a perspective view showing the exterior appearance of a projector 1 according to the present embodiment.

Figure 1:
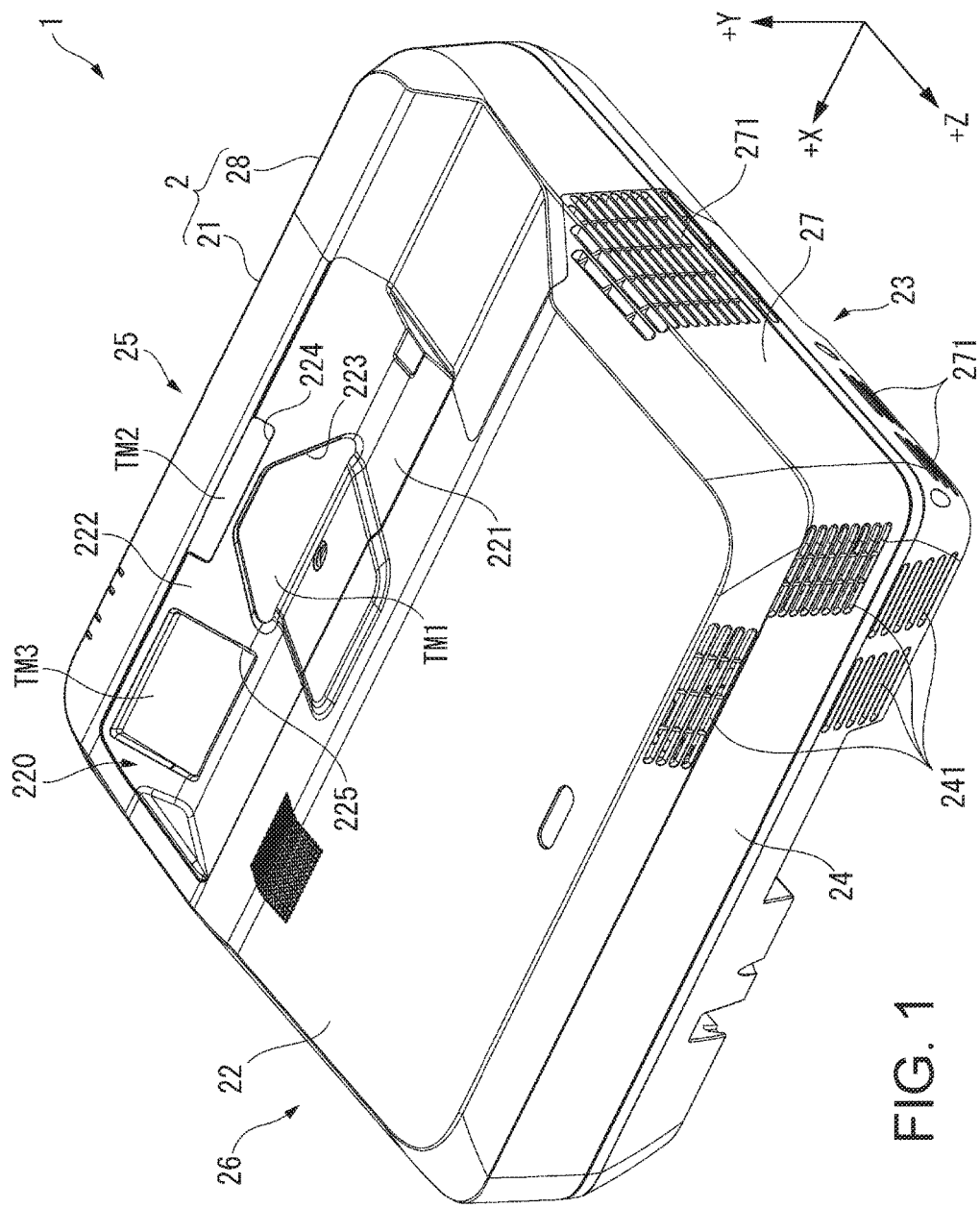
FIG. 1 is a perspective view showing the exterior appearance of a projector according to an embodiment of the invention.

Specifically, FIG. 1 is a perspective view of the projector 1 viewed obliquely downward from the front.

The projector 1 according to the present embodiment modulates light outputted from a light source apparatus 4 (see FIG. 2) provided in the projector 1 to form an image according to image information and enlarges and projects the image on a projection surface, such as a screen. The projector 1 includes an exterior enclosure 2, which accommodates an apparatus body (not shown in FIG. 1).

The thus functioning projector 1, although will be described later in detail, includes the light source apparatus 4 with a feature on the layout of optical parts.

Each configuration of the projector 1 will be described below.

Configuration of Exterior Enclosure

The exterior enclosure 2 includes an enclosure body 21 and a cover member 28, which is attached to the enclosure body 21 and forms, along with the enclosure body 21, the exterior of the projector 1, and the exterior enclosure 2 is formed in a substantially box-like shape as a whole.

The enclosure body 21 includes a top surface section 22, a bottom surface section 23, a front surface section 24, a rear surface section 25, a left side surface section 26, and aright side surface section 27 and has a substantially box-like shape with a portion thereof cut out, that is, part of the rear surface section 25 that is close to the right side surface section 27 (in other words, part of right side surface section 27 that is close to rear surface section 25) is cut out.

The top surface section 22 has a recessed section 220, which is located in a position close to the rear surface section 25 and formed by a first inclining section 221 and a second inclining section 222. Out of the first inclining section 221 and the second inclining section 222, the first inclining section 221, which is located on the side facing the front surface section 24, inclines in such a way that the first inclining section 221 approaches the bottom surface section 23 as the distance to the rear surface section 25 decreases, and the second inclining section 222, which is located on the side facing the rear surface section 25, inclines in such a way that the second inclining section 222 approaches the bottom surface section 23 as the distance to the front surface section 24 decreases. Three openings 223 to 225 are formed in the second inclining section 222.

The opening 223 is formed in a trapezoidal shape substantially at the center of the second inclining section 222. The opening 223 is an opening through which image light outputted by a projection optical apparatus 35, which will be described later, toward the front surface section 24 and the top surface section 22 passes. The opening 223 is closed by a light transmissive member TM1, which transmits visible light.

The opening 224 is located in a position shifted from the opening 222 toward the rear surface section 25. Although not shown, a light receiver that receives an infrared signal from a remote control is disposed in the opening 224. The opening 224 is also closed by a light transmissive member TM2, which transmits infrared light.

The opening 225 is located in a position shifted from the opening 223 toward the left side surface section 26. Although not shown, an imaging device that captures an image of an area where the image light described above is projected and detects the position of a pointing element in the projection area is disposed in the opening 225. The opening 225 is also closed by a light transmissive member TM3.

The front surface section 24 has a plurality of introduction ports 241, through which the air outside the exterior enclosure 2 is introduced as a cooling gas, and the right side surface section 27 has a plurality of discharge ports 271, through which the cooling gas having cooled targets to be cooled in the exterior enclosure 2 is discharged.

The thus configured enclosure body 211 has a substantially right-angled cutout portion where the rear surface section 25 and the right side surface section 27 intersect each other, as described above, and a terminal portion (not shown) to which a variety of cables can be connected is provided in the intersecting portion and in a plane parallel to the rear surface section 25. The intersecting portion is covered with the cover member 28 so that the terminal portion is not exposed, whereby the projector 1 has a satisfactory exterior appearance. The cover member 28 is detachably attached to the interesting portion, whereby the cables can be connected to the terminal portion by detaching the cover member 28.

In the following description and drawings, when viewed in the direction toward the top surface section 22, the traveling direction of the image light projected through the opening 223 is assumed to be a +Z direction. Out of a +X direction and a +Y direction that are perpendicular to the +Z direction and perpendicular to each other, the +Y direction is assumed to be the direction from the bottom surface section 23 toward the top surface section 22, and the +X direction is assumed to be the direction from the right side surface section 27 toward the left side surface section 26. Although not shown, the direction opposite the +Z direction is assumed to be a −Z direction.

Configuration of Apparatus Body

Figure 2:
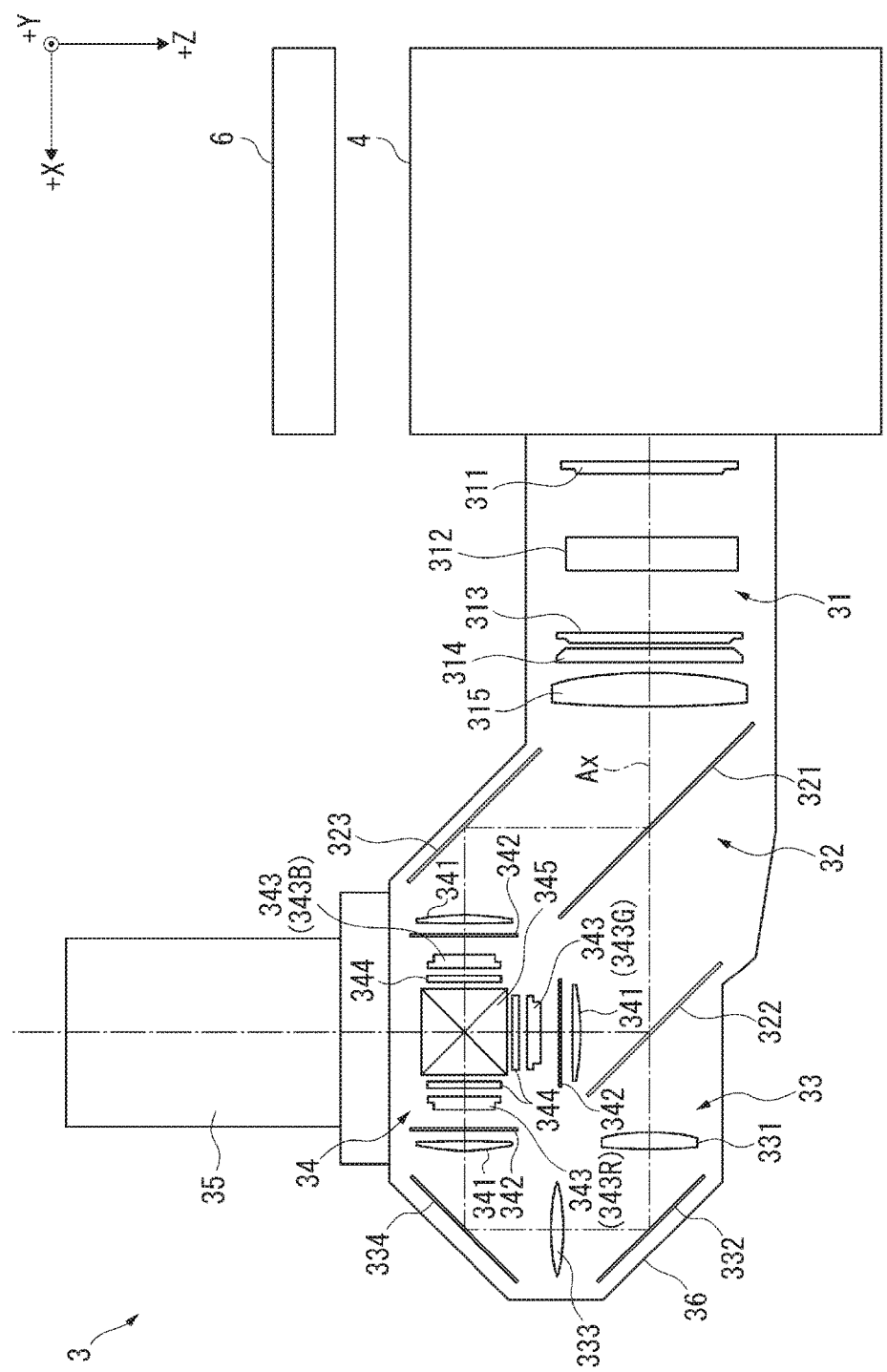
FIG. 2 is a diagrammatic view showing the configuration of an apparatus body in the embodiment.

FIG. 2 is a diagrammatic view showing the configuration of the apparatus body.

The apparatus body includes an image projection apparatus 3 and a control apparatus 6, as shown in FIG. 2. In addition, the apparatus body includes, although not shown, a power supply that supplies electronic parts that form the projector 1 with electric power and a cooler that cools the cooling targets that form the projector 1.

Out of the components described above, the control apparatus 6 is formed of a control circuit and other components and controls the action of the projector 1. For example, the control apparatus 6 outputs image information (image signal) to light modulators 343, which will be described later, to cause the light modulators 343 to each form image light according to the image information, turns on and off the light source apparatus 4, and controls the amount of light outputted therefrom.

Configuration of Image Projection Apparatus

The image projection apparatus 3 forms and projects an image according to the image information under the control of the control apparatus 6 described above. The image projection apparatus 3 is configured as a substantially L-letter-shaped optical unit extending along the +X direction and the −Z direction. The thus configured image projection apparatus 3 includes the light source apparatus 4, a homogenizing apparatus 31, a color separation apparatus 32, a relay apparatus 33, an image formation apparatus 34, the projection optical apparatus 35, and an optical part enclosure 36.

Among the components described above, the light source apparatus 4 outputs a white light flux (illumination light) along the +X direction. The configuration of the light source apparatus 4 will be described later in detail.

The homogenizing apparatus 31 homogenizes the illuminance of the illumination light incident from the light source apparatus 4 in a plane perpendicular to the center axis of the illumination light. The homogenizing apparatus 31 includes a first lens array 311, a light adjuster 312, a second lens array 313, a polarization conversion element 314, and a superimposing lens 315 sequentially arranged from the side on which the illumination light is incident. The light adjuster 312 may be omitted.

Among the components described above, the polarization conversion element 314, although not illustrated in detail, includes a plurality of polarization separation layers, reflection layers, and retardation layers.

The plurality of polarization separation layers and reflection layers are each perpendicular to the center line of the light incident through the second lens array 313, elongated in a first direction that is one of first and second directions perpendicular to each other, and alternately arranged in the second direction. The polarization separation layers are disposed in positions where sub-light fluxes having exited out of the second lens array 313 are incident, and the reflection layers are disposed in positions where the sub-light fluxes are not directly incident.

The polarization separation layers transmit p-polarized light and reflect s-polarized light. The reflection layers, which are provided in accordance with the polarization separation layers, reflect the s-polarized light reflected off the polarization separation layers in such a way that the reflected s-polarized light travels along the traveling direction of the p-polarized light. The plurality of retardation layers are provided on the optical paths of the p-polarized light having passed through the polarization separation layers and convert the incident p-polarized light into s-polarized light. The polarization directions of the light fluxes having exited out of the polarization conversion element 314 are so aligned with one another as to coincide with the polarization direction of the s-polarized light, and the entire s-polarized light exits through substantially the entire light exiting surface of the polarization conversion element 314. The polarization conversion element 314 may instead be configured to output p-polarized light.

The color separation apparatus 32 separates the light flux incident from the homogenizing apparatus 31 into the following three color light fluxes, red (R) light, green (G) light, and blue (B) light. The color separation apparatus 32 includes dichroic mirrors 321 and 322 and a reflection mirror 323.

The relay apparatus 33 is provided on the optical path of the red light, out of the three separated color light fluxes, which has an optical path longer than those of the other color light fluxes. The relay apparatus 33 includes a light-incident-side lens 331, a relay lens 333, and reflection mirrors 332 and 334.

The image formation apparatus 34 modulates the separated color light fluxes in accordance with the image information and then combines the color light fluxes with one another to form image light. The image formation apparatus 34 includes field lenses 341, light-incident-side polarizers 342, the light modulators 343, and light-exiting-side polarizers 344 provided on a color light basis, and a single color combining apparatus 345, which combines the modulated color light fluxes with one another to form the image light.

Among the components described above, the light modulators (reference characters 343R, 343G, and 343B denote light modulators for red, green, and blue, respectively) each employ a configuration including a liquid crystal panel in the present embodiment.

The light combining apparatus 345 is formed of a cross dichroic prism in the present embodiment and may instead be formed of the combination of a plurality of dichroic mirrors.

Figure 3:
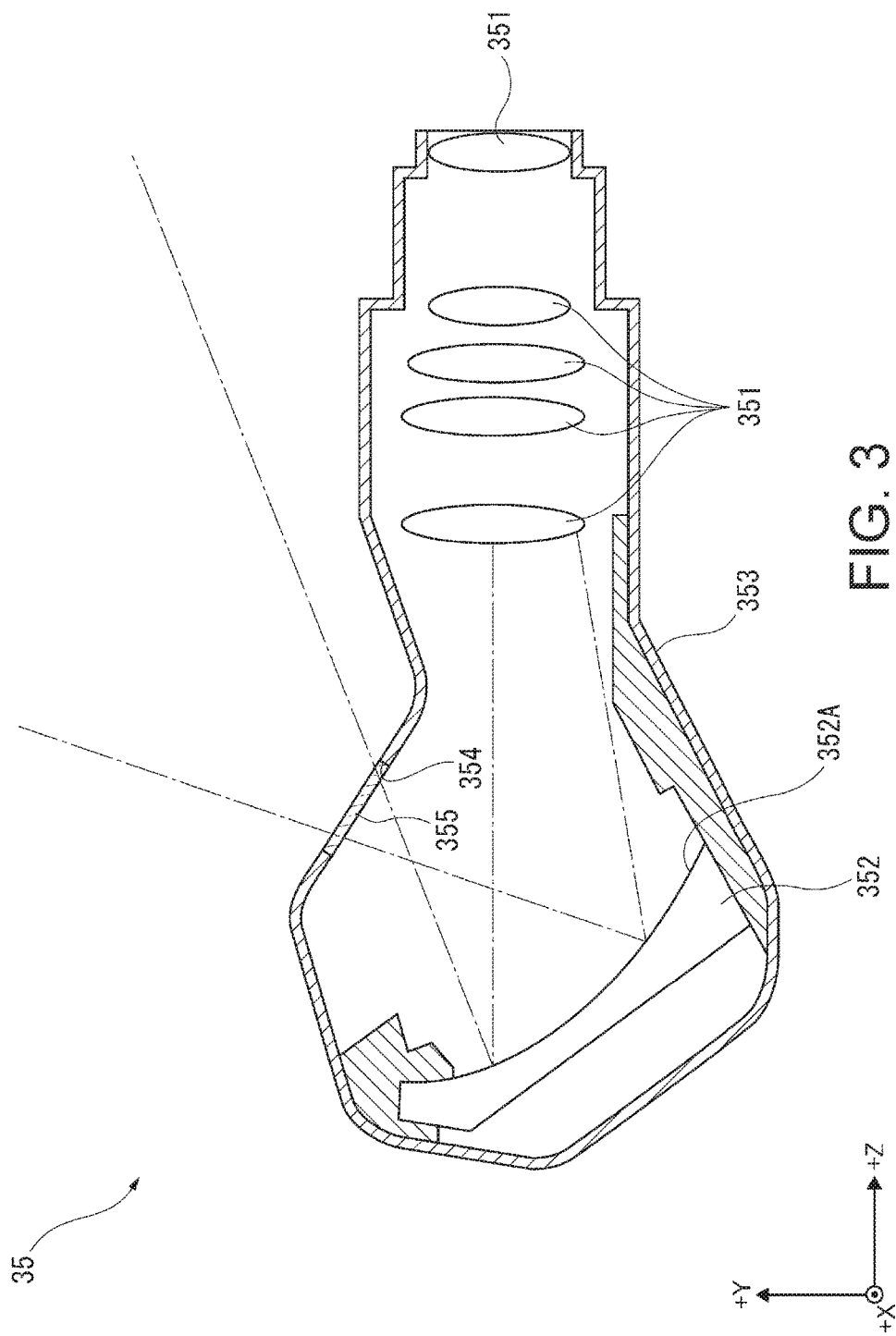
FIG. 3 is a cross-sectional view diagrammatically showing the interior configuration of a projection optical apparatus in the embodiment.

FIG. 3 is a cross-sectional view diagrammatically showing the interior configuration of the projection optical apparatus 35.

The projection optical apparatus 35 enlarges and projects the image light incident from the image formation apparatus 34 on the projection surface described above. The projection optical apparatus 35 includes a plurality of lenses 351, an aspheric mirror 352, and a hollow holder 353, which accommodates the lenses 351 and the mirror 352, as shown in FIG. 3.

The plurality of lenses 351 include, for example, a zoom lens and a focus lens. FIG. 3 shows five lenses 351, but the number of lenses 351 that form the projection optical apparatus 35 can be changed as appropriate.

The aspheric mirror 352 is disposed in the most downstream position of the optical path in the projection optical apparatus 35 in such a way that a reflection surface 352A having a non-rotationally symmetric, free-form shape faces the +Z-direction side and the +Y-direction side. The aspheric mirror 352 deflects the image light guided toward the −Z-direction by the plurality of lenses 351 side toward the +Z-direction side and the +Y-direction side and widens the image light.

The holder 353 has an opening 354, through which the image light reflected off the aspheric mirror 352 passes, formed in a portion on the top surface section 22 side of the exterior enclosure 2 (see FIG. 1), which accommodates the holder 353. A substrate 355, which is made of glass or any other material that transmits visible light, is fit into the opening 354. The image light having passed through the opening 354 and the substrate 355 exits out of the exterior enclosure 2 through the opening 223 described above (see FIG. 1).

The optical part enclosure 36 accommodates the optical parts that form the apparatus 31 to 34 described above, as shown in FIG. 2. An illumination optical axis Ax, which is a designed optical axis, is set in the optical part enclosure 36, and the light source apparatus 4 and the apparatus 31 to 34 described above are disposed in predetermined positions along the illumination optical axis Ax. The center axis of the light outputted from the light source apparatus 4, that is, a first illumination optical axis Ax1 (see FIG. 4), which will be described later, therefore coincides with the illumination optical axis Ax.

Configuration of Light Source Apparatus

Figure 4:
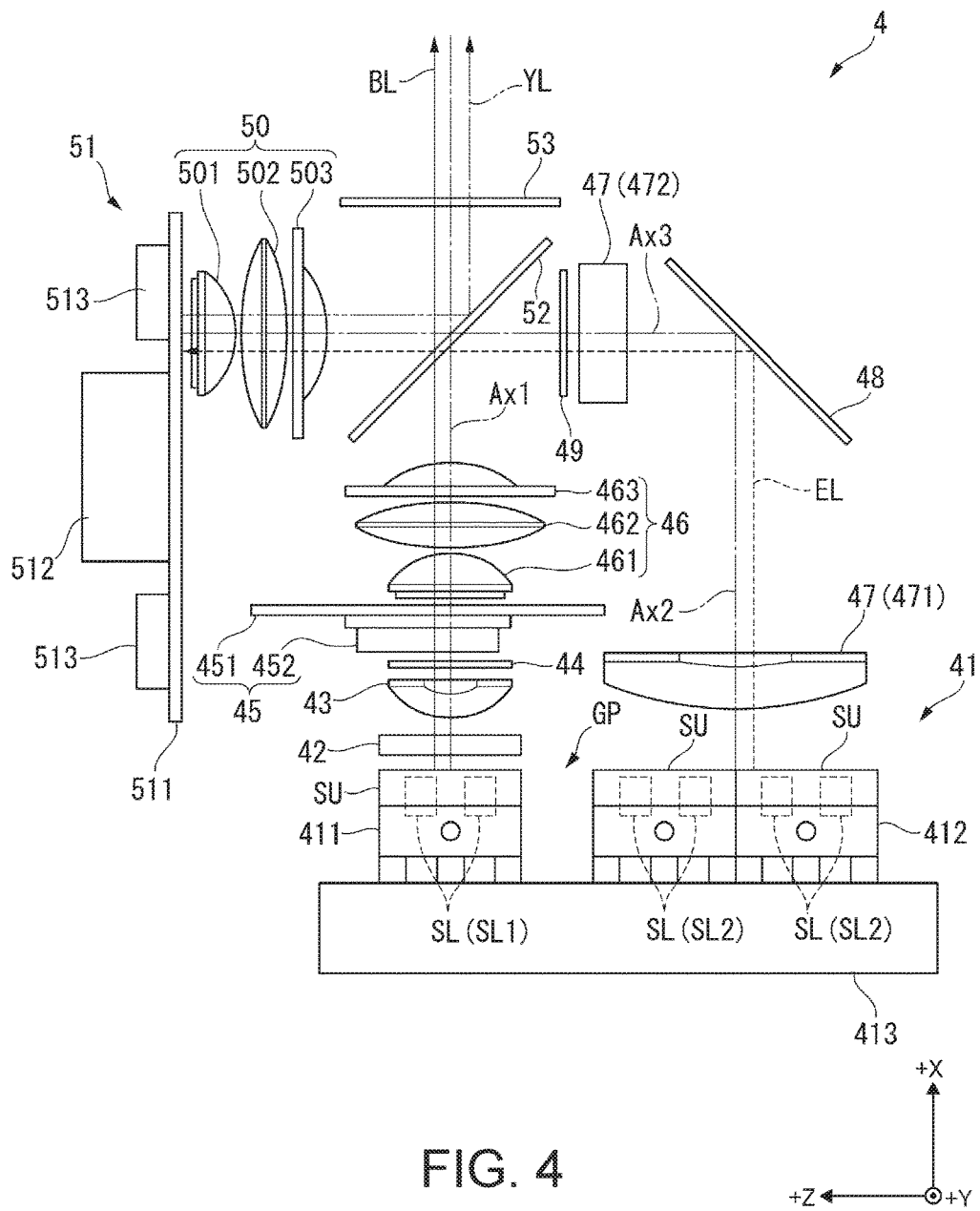
FIG. 4 is a diagrammatic view showing the configuration of a light source apparatus in the embodiment.

FIG. 4 is a diagrammatic view showing the configuration of the light source apparatus 4.

The light source apparatus 4 outputs the illumination light to the homogenizing apparatus 31, as described above. The light source apparatus 4 includes alight source section 41, a prism mirror 42, a light collection lens 43, an assistant diffusing element 44, a diffuser 45, a first light collection element 46, an afocal optical apparatus 47, a reflection member 48, a diffusing element 49, a second light collection element 50, a wavelength converter 51, a light combiner 52, and a retardation film 53, as shown in FIG. 4.

Among the components described above, a first light source section 411, which forms the light source section 41, the prism mirror 42, the light collection lens 43, the assistant diffusing element 44, the diffuser 45, the first light collection element 46, and the retardation film 53 are arranged along the first illumination optical axis Ax1, which extends along the +X direction. A second light source section 412, which forms the light source section 41, and a first lens 471, which forms the afocal optical apparatus 47, are arranged along a second illumination optical axis Ax2, which is parallel to the first illumination optical axis Ax1. A second lens 472, which forms the afocal optical apparatus 47, the diffusing element 49, the second light collection element 50, and the wavelength converter 51 are arranged on a third illumination optical axis Ax3, which extends along the +Z direction and intersects the first illumination optical axis Ax1 and the second illumination optical axis Ax2. Further, the light combiner 52 is disposed in the position where the first illumination optical axis Ax1 and the third illumination optical axis Ax3 intersect each other. The reflection member 48 is disposed in the position where the second illumination optical axis Ax2 and the third illumination optical axis Ax3 intersect each other. It is noted that the first illumination optical axis Ax1 and the second illumination optical axis Ax2 are not necessarily parallel to each other in the exact sense. Further, the third illumination optical axis Ax3 may not be perpendicular to the first illumination optical axis Ax1 or the second illumination optical axis Ax2 and only needs to intersect the illumination optical axes Ax1 and Ax2.

Configuration of Light Source Section

The light source section 41 includes the first light source section 411, the second light source section 412, and a radiator 413.

The first light source section 411 and the second light source section 412 are disposed side by side along the +Z direction and each emit blue light in the +X direction. That is, the second light source section 412 is disposed on the +Z-direction side of the first light source section 411.

The first light source section 411 and the second light source section 412 each include a solid-state light source unit SU, in which a plurality of solid-state light sources SL are arranged in a matrix formed of rows and columns. Specifically, the first light source section 411 includes one solid-state light source unit SU, and the second light source section 412 includes two solid-state light source units SU. That is, the number of solid-state light sources SL2 (excitation solid-state light sources) provided in the second light source section 412 is greater than the number of solid-state light sources SL1 (blue solid-state light sources) provided in the first light source section 411, and the amount of blue light (excitation light EL) outputted from the second light source section 412 is therefore greater than the amount of blue light (blue light BL) outputted from the first light source section 411. The reason for this is as follows.

The blue light outputted from the first light source section 411 travels via the prism mirror 42, the light collection lens 43, the assistant diffusing element 44, the diffuser 45, the first light collection element 46, the light combiner 52, and the retardation film 53 with no large loss of the amount of light and exits out of the light source apparatus 4.

In contrast, the blue light outputted from the second light source section 412 (excitation light EL) is used to produce fluorescence YL (light containing green light and red light) in the wavelength converter 51 and is therefore required to have a relatively large amount of light. The amount of produced fluorescence YL (amount of emitted light) depends on the wavelength conversion factor of the wavelength converter 51 and is smaller than the amount of light incident on the wavelength converter 51.

The second light source section 412 therefore needs to output a larger amount of blue light than the amount of blue light outputted from the first light source section 411. The number of the solid-state light sources SL2 provided in the second light source section 412 is therefore set to be greater than the number of the solid-state light sources SL1 provided in the first light source section 411.

The two solid-state light source units SU provided in the second light source section 412 are disposed in parallel to each other along the +Z direction (that is, direction that connects first light source section 411 and the second light source section 412 to each other). The light flux width of the blue light from the second light source section 412 therefore tends to be greater in the +Z direction than the light flux width of the blue light from the first light source section 411. The first lens 471 of the afocal optical apparatus 47 is used to efficiently collect the blue light from the thus configured second light source section 412.

Although not shown, in each of the solid-state light source units SU, the number of solid-state light sources SL arranged in each of the rows differs from the number of solid-state light sources SL arranged in each of the columns. In the present embodiment, the solid-state light source units SU are each so configured that the columns, each having a smaller number of solid-state light sources SL, extend along the +Z direction and the rows, each having a greater number of solid-state light sources SL, extend along the +Y direction perpendicular to the first illumination axis Ax1 or the second illumination axis Ax2 and the +Z direction described above. The arrangement described above prevents the size of the light source apparatus 4 from increasing in the +Z direction, which is the direction in which the solid-state light source units SU are arranged in the second light source section 412.

As each of the solid-state light sources SL arranged in each of the solid-state light source units SU, an LD (laser diode) that emits s-polarized blue light having a peak wavelength 440 nm is employed in the present embodiment. An LD that emits blue light having a peak wavelength of 446nm or 460 nm may instead be employed as each of the solid-state light sources SL. Still instead, solid-state light sources that emit blue light fluxes having peak wavelengths different from each other may both be provided in each of the light source sections 411 and 412, or a solid-state light source that emits p-polarized blue light may be employed.

The blue light outputted from the second light source section 412 is used as excitation light that excites a phosphor contained in the wavelength converter 51, as described above. Therefore, in the following description, to distinguish the blue light outputted from the second light source section 412 from the blue light BL outputted from the first light source section 411, the blue light outputted from the second light source section 412 is called excitation light EL in some cases.

The first light source section 411 and the second light source section 412 are turned on under the control of the control apparatus 6, as described above. The control apparatus 6 can therefore adjust the amount of blue light BL outputted from the first light source section 411 and the amount of excitation light EL outputted from the second light source section 412. The control apparatus 6, which adjusts the amounts of outputted light, can therefore adjust the amount and white balance (color balance) of the illumination light outputted from the light source apparatus 4.

The radiator 413 is connected to the first light source section 411 and the second light source section 412, dissipates heat transferred from the light source sections 411 and 412, and in turn cools the light source sections 411 and 412. The radiator 413 also has the function as a support member that supports the first light source section 411 and the second light source section 412 to form the light source apparatus 4 as an integrated unit. The radiator 413 includes, although not shown, a heat receiver that supports the light source sections 411 and 412 and a heat sink having a plurality of fins.

The first light source section 411 and the second light source section 412 are separately disposed each other on the radiator 413 in the Z direction. That is, a gap GP is formed between the first light source section 411 and the second light source section 412. This is because the heat of the first light section 411 or the second light source section 412 does not affect each light source section.

Configurations of Prism Mirror and Light Collection Lens

The prism mirror 42 collects and outputs the blue light BL emitted from each of the solid-state light sources SL1 in the first light source section 411. Specifically, the prism mirror 42 changes the optical path of the blue light BL emitted from each of the solid-state light sources SL1 to reduce the diameter of the blue light flux BL outputted from the light source section 411.

The light collection lens 43 is located on the first illumination optical axis Ax1 and between the first light source section 411 and the diffuser 45 (more specifically, between prism mirror 42 and assistant diffusing element 44). The light collection lens 43 collects the blue light BL incident from the each of the solid-state light sources SL1 via the prism mirror 42 and causes the collected blue light BL to be incident on a diffusion layer of the diffuser 45. In detail, the light collection lens 43 superimposes the blue light fluxes BL emitted from the solid-state light sources SL1 on one another on the diffusion layer. That is, the light collection lens 43 is a superimposing element.

Configuration of Assistant Diffusing Element

The assistant diffusing element 44 is located on the first illumination optical axis Ax1 and between the light collection lens 43 and the diffuser 45. The assistant diffusing element 44 assists the diffuser 45 in diffusing the blue light BL and diffuses the blue light BL incident through the light collection lens 43 to adjust the light flux diameter of the blue light (size of light source image) incident on the diffuser 45. The light diffusion factor of the assistant diffusing element 44 is smaller than the light diffusion factor of the diffuser 45. The thus configured assistant diffusing element 44 is made, for example, of ground glass.

Configuration of Diffuser

The diffuser 45 is disposed on the first illumination optical axis Ax1 and between the first light source section 411 and the light combiner 52. Specifically, the diffuser 45 is disposed between the assistant diffusing element 44 and the first light collection element 46. The diffuser 45 diffuses and transmits the blue light BL incident through the light collection lens 43 via the assistant diffusing element 44 at a predetermined diffusion factor. That is, the diffuser 45 is a transmissive diffuser.

The thus configured diffuser 45 includes a substrate 451, which includes the diffusion layer that diffuses and transmits the blue light BL incident thereon, and a rotator 452, which rotates the substrate 451 around an axis of rotation substantially parallel to the first illumination optical axis Ax1. The diffuser 45 diffuses and transmits the blue light BL diffused by the assistant diffusing element 44 and incident on the diffuser 45 at a diffusion angle similar to the exiting angle of the fluorescence YL emitted from the wavelength converter 51. The diffusion layer, which is located on the substrate 451, may be located on the surface on which the blue light BL is incident or the surface through which the blue light BL exits.

The rotator 452 may be omitted, but rotating the substrate 451 described above by the rotator 452 allows effective reduction in speckles.

Configuration of First Light Collection Element

The first light collection element 46 is disposed on the first illumination optical axis Ax1 and between the diffuser 45 and the light combiner 52. The first light collection element 46 is a parallelizing element that parallelizes the blue light BL having exited out of the diffuser 45 and causes the blue light BL to be incident on the light combiner 52. The first light collection element 46 is formed of three lenses 461 to 463 in the present embodiment, but the number of lenses that form the first light collection element 46 can be changed as appropriate.

Configurations of Afocal Optical Apparatus and Reflection Member

The afocal optical apparatus 47 collects the excitation light EL outputted from the second light source section 412, reduces the light flux diameter of the excitation light EL, parallelizes the excitation light EL having the reduced diameter, and causes the resultant excitation light EL to exit. The afocal optical apparatus 47 includes the first lens 471 and the second lens 472.

The first lens 471 is disposed on the second illumination optical axis Ax2 described above and between the second light source section 412 and the reflection member 48. The first lens 471 collects the excitation light EL incident from each of the solid-state light sources SL2 in the second light source section 412 and causes the collected excitation light EL to be incident on the second lens 472.

The second lens 472 is disposed on the third illumination optical axis Ax3 described above and between the reflection member 48 and the light combiner 52 (in detail, between the reflection member 48 and diffusing element 49). The second lens 472 parallelizes the excitation light EL incident through the first lens 471 via the reflection member 48.

The reflection member 48 is located in the position where the second illumination optical axis Ax2 and the third illumination optical axis Ax3 intersect each other. The reflection member 48 reflects the excitation light EL incident through the first lens 471 in such a way that the reflected excitation light EL travels along the third illumination optical axis Ax3 and causes the excitation light EL to be incident on the second lens 472.

Configuration of Diffusing Element

The diffusing element 49 is a diffusing plate that is disposed on the third illumination optical axis Ax3 and between the second lens 472 and the light combiner 52 and diffuses the excitation light EL incident through the second lens 472. When the excitation light EL passes through the diffusing element 49, variation in illuminance of the excitation light EL in a plane perpendicular to the center axis of the excitation light EL is suppressed.

It is conceivable to employ a homogenizer optical apparatus including a pair of multi-lenses in place of the diffusing element 49 described above. The homogenizer optical apparatus has the function of homogenizing the illuminance of the excitation light EL in the plane described above on the basis of the configuration of the homogenizer optical apparatus in which the light-incident-side multi-lens divides the excitation light EL incident thereon into a plurality of sub-light fluxes and the light-exiting-side multi-lens superimposes the plurality of sub-light fluxes on one another in a predetermined position (wavelength conversion element 511, for example). However, since the thus configured homogenizer optical apparatus is expensive, and a predetermined distance is required between the pair of multi-lenses described above, the optical path length of the excitation light EL undesirably increases. The homogenizer optical apparatus is therefore unsuitable for reduction in the size of the light source apparatus 4.

In contrast, employing the diffusing element 49 described above allows not only an inexpensive configuration of the light source apparatus 4 as compared with the case where the homogenizer optical apparatus is employed but suppression of an increase in the optical path length of the excitation light EL, whereby the size of the light source apparatus 4 can be reduced.

Configuration of Second Light Collection Element

The second light collection element 50 is disposed on the third illumination optical axis Ax3 and between the light combiner 52 and the wavelength converter 51. The second light collection element 50 not only collects the excitation light EL incident from the diffusing element 49 via the light combiner 52 and causes the collected excitation light EL to be incident on the wavelength converter 51 (wavelength conversion element 511) but parallelizes and outputs the fluorescence YL incident from the wavelength converter 51. That is, the second light collection element 50 corresponds to an excitation light collection element.

The thus functioning second light collection element 50 is formed of three lenses 501 to 503, but the number of lenses that form the second light collection element 50 can be changed as appropriate.

Configuration of Wavelength Converter

The wavelength converter 51 is a reflective wavelength converter that is excited by the excitation light EL incident thereon and outputs the fluorescence YL having a wavelength different from the wavelength of the excitation light EL (in detail, fluorescence YL containing green light and red light, in other words, light converted by wavelength converter 51) in the direction opposite the direction in which the excitation light EL is incident. The wavelength converter 51 includes the wavelength conversion element 511, a rotator 512, which rotates the wavelength conversion element 511, and a radiator 513, which dissipates heat transferred from the wavelength conversion element 511.

Among the components described above, the rotator 512 rotates the wavelength conversion element 511 around an axis of rotation substantially parallel to the third illumination optical axis Ax3 to move the position in which the excitation light EL is incident on the wavelength conversion element 511. Occurrence of thermal saturation in the wavelength conversion element 511 is thus avoided.

The radiator 513, which is disposed on the wavelength conversion element 511, is located on the side opposite the side where the excitation light EL is incident. The radiator 513 dissipates heat produced in the wavelength conversion element 511 to cool the wavelength conversion element 511.

The wavelength conversion element 511, although not illustrated in detail, includes a disk-shaped support body, a reflection layer located on the light incident surface of the support body, and a wavelength conversion layer located on the reflection layer.

Among the components described above, the wavelength conversion layer is a phosphor layer containing a phosphor that is excited by the excitation light EL and diffusively outputs the fluorescence YL, which is non-polarized light (fluorescence YL having peak wavelength that belongs, for example, to wavelength region from 500 to 700 nm). Part of the fluorescence YL produced in the wavelength conversion layer exits toward the second light collection element 50, and the remainder of the fluorescence YL exits toward the reflection layer.

The reflection layer reflects the fluorescence YL incident from the wavelength conversion layer toward the second light collection element 50.

The fluorescence YL produced in the thus configured wavelength conversion element 511 is incident via the second light collection element 50 on the light combiner 52.

Configuration of Light Combiner

The light combiner 52 is located in the position where the first illumination optical axis Ax1 and the third illumination optical axis Ax3 intersect each other, as described above. The light combiner 52 in the present embodiment is formed of a wavelength-dependent dichroic mirror that transmits blue light and reflects green light and red light and is so disposed as to incline with respect to the illumination optical axes Ax1 and Ax3.

The blue light BL outputted from the first light source section 411 and traveling along the first illumination optical axis Ax1 therefore passes through the light combiner 52 along the first illumination optical axis Ax1.

The excitation light EL outputted from the second light source section 412 and reflected off the reflection member 48 described above passes through the light combiner 52 along the third illumination optical axis Ax3.

On the other hand, the fluorescence YL described above produced in the wavelength converter 51 is so reflected off the light combiner 52 as to travel along the first illumination optical axis Ax1.

The thus configured light combiner 52 causes the blue light BL incident through the first light collection element 46 and the fluorescence YL incident through the second light collection element 50 to exit along the first illumination optical axis Ax1 toward the retardation film 53, and the white illumination light, which is the combination of the blue light BL and the fluorescence YL, is incident on the retardation film 53.

Configuration of Retardation Film

The retardation film 53 rotates the polarization direction of the illumination light incident via the light combiner 52. Specifically, the retardation film 53 converts the blue light BL and the fluorescence YL contained in the white light incident on the retardation film 53 into circularly polarized light containing both s-polarized light and p-polarized light. The reason why the thus configured retardation film 53 is provided is as follows.

The fluorescence YL having exited out of the light combiner 52 is non-polarized light. Out of the p-polarized component and the s-polarized component that form the fluorescence YL, the s-polarized component is, when it is incident on the polarization conversion element 314 described above, is reflected off the polarization separation layers, is then reflected off the reflection layers, and exits out of the polarization conversion element 314. On the other hand, the p-polarized component passes through the polarization separation layers, and is then converted into the s-polarized component by the retardation layers, and exits out of the polarization conversion element 314. As described above, the fluorescence YL exits through the substantially entire light exiting surface of the polarization conversion element 314 irrespective of the presence or absence of the retardation film 53.

On the other hand, the blue light BL having exited out of the light combiner 52 is s-polarized light. Therefore, in a case where the retardation film 53 described above is not present, and when the blue light BL is incident on the polarization conversion element 314, substantially the entire blue light BL is reflected off the polarization separation layers and the reflection layers and therefore exits through the light exiting surface of the polarization conversion element 314 but through only the positions corresponding to the reflection layers. That is, the blue light BL exits in the form of stripes through the light exiting surface of the polarization conversion element 314. In this case, the area where the fluorescence YL, out of the illumination light having exited out of the polarization conversion element 314, passes differs from the area where the blue light BL, out of the illumination light, passes, so that illuminance unevenness occurs in an image formation area of each of the light modulators 343, which is the area illuminated with the light flux outputted from the light source apparatus 4 via the homogenizing apparatus 31, and color unevenness in turn occurs in an image formed and projected by the light modulator 343.

To avoid the problem described above, the retardation film 53 described above causes the fluorescence YL and the blue light BL to be each formed of both the s-polarized light and the p-polarized light, whereby the fluorescence YL and the blue light BL exit through substantially the entire light exiting surface of the polarization conversion element 314 described above. The occurrence of the illuminance unevenness described above and in turn the occurrence of the color unevenness described above are therefore avoided.

The projector 1 according to the present embodiment described above provides the following advantageous effects.

The blue light BL and the excitation light EL outputted from the first light source section 411 and the second light source section 412 travel along the first illumination optical axis Ax1 and the second illumination optical axis Ax2, which are parallel to each other, respectively. Out of the two light fluxes, the excitation light EL is reflected off the reflection member 48, travels along the third illumination optical axis Ax3, which intersects the first illumination optical axis Ax1 described above, and is incident on the wavelength converter 51. Since the configuration described above allows the optical path of the excitation light EL to be longer than the optical path of the blue light BL, the afocal optical apparatus 47, the second light collection element 50, and other optical parts can, for example, be arranged to readily reduce the light flux diameter of the excitation light EL, whereby the fluorescence YL, which is the converted light, can be readily incident on the light combiner 52. Further, since the first light source section 411 and the second light source section 412 are arranged side by side in the +Z direction, so that the second light source section 412 is not shifted with respect to the first light source section 411 in the direction in which the blue light BL and the excitation light EL exit, and the excitation light EL does not travel straight only in one direction, unlike the blue light BL, but is reflected off the reflection member 48, a compact light source apparatus 4 can be configured with the optical path length of the excitation light EL increased. The size of the light source apparatus 4 can therefore be reduced.

Further, since the first light source section 411, which outputs the blue light BL, and the second light source section 412, which outputs the excitation light EL, are provided, it is not necessary to provide a retardation element that rotates the polarization direction of blue light outputted from one light source section to produce an s-polarized component and a p-polarized component or a polarization separation element that separates the s-polarized light and p-polarized light from each other. Moreover, since the control apparatus 6 can separately turn on the first light source section 411 and the second light source section 412, separate adjustment of the amount of each of the blue light BL and the excitation light EL does not require a pivot apparatus that causes the retardation element to pivot. Therefore, the size of the light source apparatus 4 can be readily reduced, and the balance between the amount of the blue light BL and the amount of the excitation light EL and in turn the color balance of the light flux outputted from the light source apparatus 4 can be readily adjusted.

In addition, a dichroic mirror that transmits the blue light BL and the excitation light EL but reflects the fluorescence YL can be employed as the light combiner 52. The light source apparatus 4 can therefore have an inexpensive configuration as compared with a case where a polarization separation element is employed as the light combiner 52. Further, the light combiner 52 can perform wavelength-dependent transmission and reflection of light incident thereon. Therefore, even in a case where there is a change in the polarization state of the light incident on the light combiner 52, no change in the color balance of the light outputted from the light source apparatus occurs.

The first lens 471, which forms the afocal optical apparatus 47, is disposed on the second illumination optical axis Ax2 and between the second light source section 412 and the reflection member 48 and collects the excitation light EL outputted from the second light source section 412. Since the excitation light EL outputted from the second light source section 412 can therefore be collected by the first lens 471 described above, the excitation light EL is efficiently allowed to be incident on the wavelength converter 51.

Similarly, the second lens 47, which forms the afocal optical apparatus 47, is disposed on the third illumination optical axis Ax3 and between the reflection member 48 and the light combiner 52 and parallelizes the excitation light EL reflected off the reflection member 48. The second light collection element 50, which is an excitation light collection element, is disposed on the third illumination optical axis Ax3 and between the light combiner 52 and the wavelength converter 51, collects the excitation light EL, and causes the collected excitation light EL to be incident on the wavelength converter 51. The light flux diameter of the excitation light EL incident on the wavelength converter 51 can therefore be reduced, whereby the light flux diameter of the fluorescence YL diffusively outputted from the wavelength converter 51 can be reduced. The fluorescence YL can therefore be readily incident on the second light collection element 50.

Further, the second light collection element 50 parallelizes the fluorescence YL incident from the wavelength converter 51 and causes the fluorescence YL to be incident on the light combiner 52. As a result, diffusion of the fluorescence YL can be avoided. The light flux diameters of the fluorescence YL and the blue light BL having exited via the light combiner 52 are readily allowed to be equal to each other.

In a case where illuminance unevenness occurs in the area where the wavelength converter 51 is illuminated with the excitation light EL so that excitation light EL having locally high illuminance is incident on the illuminated area, thermal saturation is likely to occur in the wavelength converter 51 (wavelength conversion element 511), resulting in a decrease in the efficiency of the wavelength conversion to the fluorescence YL and a possible reduction in the life of the wavelength converter 51.

In contrast, the diffusing element 49, which diffuses the excitation light EL incident thereon, is disposed on the third illumination optical axis Ax3 and between the second lens 472 and the light combiner 52. Since the excitation light EL diffused by the diffusing element 49 is therefore collected by the second light collection element 50 and incident on the wavelength converter 51, occurrence of illuminance unevenness in the illuminated area of the wavelength converter 51 can be avoided. Therefore, the occurrence of thermal saturation described above can be avoided, and a decrease in the efficiency of the wavelength conversion to the fluorescence YL and the reduction in the life of the wavelength converter 51 can be avoided.

Since the blue light BL outputted from the first light source section 411 is formed of blue laser beams emitted from the solid-state light sources SL1, speckles are observed when the blue light BL is scattered. The speckles degrade the quality of an image displayed by the projector 1.

To avoid the problem described above, the diffuser 45 disposed on the first illumination optical axis Ax1 and between the first light source section 411 and the light combiner 52 diffuses the blue light BL, whereby the speckles described above can be suppressed. The image degradation described above can therefore be suppressed.

Further, the diffuser 45 is a transmissive diffuser that diffuses and transmits light incident thereon. Therefore, an increase in the optical path length of the blue light BL can be suppressed, and the size of the light source apparatus 4 can be readily reduced, as compared with a case where a reflective diffuser is employed.

The first light source section 411 includes the plurality of solid-state light sources SL1, each of which emits the blue light BL. Further, the light collection lens 43, which serves as a superimposing element that superimposes the blue light fluxes BL emitted from the plurality of solid-state light sources SL1 on one another on the diffuser 45, is disposed on the first illumination optical axis Ax1 and between the first light source section 411 and the diffuser 45. The light collection lens 43 therefore allows the blue light BL emitted from each of the solid-state light sources SL1 to be efficiently incident on the diffuser 45, as in the case of the second light collection element 50 described above. Further, since the light collection lens 43 superimposes the light fluxes emitted from the solid-state light sources SL1 on one another on the diffuser 45, occurrence of luminance unevenness in the diffused light outputted from the diffuser 45 can be avoided, whereby the illuminance of the blue light BL outputted from the diffuser 45 in a plane perpendicular to the center axis of the blue light BL can be substantially homogenized. Occurrence of illuminance unevenness in the image formation area of each of the light modulators 343, which is the area illuminated with the light flux outputted from the light source apparatus 4 can therefore be avoided, and occurrence of color unevenness in an image formed and displayed by the light flux can be in turn avoided. The light collection lens 43 is formed of a single lens. The thus configured light collection lens 43 prevents an increase in the length of the optical path of the blue light BL, whereby the size of the light source apparatus 4 can be readily reduced.

When the blue light BL diffused by the diffuser 45 is directly incident on the light combiner 52, the light flux diameter of the blue light BL increases as the blue light BL travels.

In contrast, the first light collection member 46, which serves as a parallelizing element and parallelizes the blue light BL outputted from the diffuser 45 and causes the blue light BL to be incident on the light combiner 52, is disposed on the first illumination optical axis Ax1 and between the diffuser 45 and the light combiner 52. The divergence of the blue light BL can therefore be suppressed. Further, since the light source apparatus 4 includes the second light collection element 50, which serves as an excitation light collection element, the first light collection member 46 and the second light collection element 50 readily allow the light flux diameters of the blue light BL and the fluorescence YL to be equal to each other. Therefore, in the first lens array 311, which is an optical part on which the light flux outputted from the light source apparatus 4 is first incident, the illumination range of the blue light BL and the illumination range of the converted light are readily allowed to be equal to each other. Occurrence of a decrease in the illuminance and deterioration of the color balance in the first lens array 311 can therefore be avoided, and deterioration of the color balance and occurrence of color unevenness in a displayed image can in turn be avoided.

The light combiner 52 transmits the blue light BL and the excitation light EL but reflects the fluorescence YL on the basis of the wavelength of light incident on the light combiner 52. Since a dichroic mirror can therefore be employed as the light combiner 52, the light source apparatus 4 can have an inexpensive configuration as compared with a case where a polarization separation element is employed as the light combiner 52. In addition, the transmission of the blue light BL and the excitation light EL and the reflection of the fluorescence YL performed by the light combiner 52 can be performed based not on the polarization state but on the wavelength. Therefore, even in a case where there is a change in the polarization state of the light incident on the light combiner 52 (blue light BL, excitation light EL, and fluorescence YL), occurrence of deterioration of the color balance of the light outputted from the light source apparatus 4 can be avoided. It is noted that a dichroic prism may be employed as the light combiner 52 in place of the dichroic mirror.

The first light source section 411 and the second light source section 412 are disposed with a gap GP therebetween. The gap GP allows heat produced in one of the first light source section 411 and the second light source section 412 to be unlikely to be transferred to the other. An increase in the temperature of each of the first light source section 411 and the second light source section 412 can therefore be suppressed, whereby a decrease in output efficiency of the blue light BL and the excitation light EL can be suppressed.

The light source section 41 includes the radiator 413, which is connected to the first light source section 411 and the second light source section 412. The radiator 413 can therefore dissipate heat generated in the first light source section 411 and the second light source section 412. An increases in the temperature of each of the first light source section 411 and the second light source section 412 can therefore be suppressed, whereby a decrease in output efficiency of the blue light BL and the excitation light EL can be suppressed. In addition, since the first light source section 411 and the second light source section 412 need to be provided with no radiator, an increase in the number of parts can be avoided.

The excitation light EL is incident on the wavelength converter 51 and converted into the fluorescence YL. Since the wavelength converter 51 produces the fluorescence YL (yellow light) to be combined with the blue light BL, and the light source apparatus 4 outputs the white light that is the combination of the fluorescence YL and the blue light BL, the amount of the excitation light EL incident on the wavelength converter 51 needs to be greater than the amount of the blue light BL outputted by the first light source section 411. Further, in consideration of the efficiency of the wavelength conversion from the excitation light EL to the fluorescence YL performed by the wavelength converter 51, a still greater amount of excitation light EL is required.

Whereas, the number of the solid-state light sources SL2 (excitation solid-state light sources) arranged in the second light source section 412 is greater than the number of solid-state light sources SL1 (blue solid-state light sources)

arranged in the first light source section 411. The second light source section 412 can therefore reliably output the excitation light EL the amount of which is greater than the amount of the blue light BL outputted from the first light source section 411. The light source apparatus 4 can therefore readily output the white light.

Variations of Embodiment

The invention is not limited to the embodiment described above, and changes, improvements, and other modifications to the extent that they can achieve the advantage of the invention fall within the scope of the invention.

In the embodiment described above, the wavelength converter 51 is configured to include the wavelength conversion element 511, the rotator 512, and the dissipation member 513, but not necessarily, and the wavelength converter 51 only needs to include the wavelength conversion element 511, and the rotator 512 or the dissipation member 513 may not necessarily be provided. Further, the wavelength converter 51 is configured as a reflective wavelength converter that diffusively outputs the fluorescence YL in the direction opposite the direction in which the excitation light EL is incident, but not necessarily, and a transmissive wavelength converter may be employed in the light source apparatus.

In the embodiment described above, the diffuser 45 is configured to include the substrate 451, which includes the diffusion layer, and the rotator 452, but not necessarily, and the diffuser 45 only needs to include the substrate 451, and the rotator 452 is not necessarily provided. It is, however, noted that rotating the substrate 451 allows suitable reduction in speckles, as described above.

Further, the diffuser 45 is configured to diffuse and transmit the blue light BL incident thereon, but not necessarily, and the diffuser 45 may be configured to diffuse and reflect the blue light BL incident thereon. Moreover, the thus configured diffuser 45 may even be omitted. In this case, the solid-state light sources SL1 in the first light source section 411 may each be provided with a diffusing element that diffuses the blue light emitted from the solid-state light source SL1. Further, in this case, the light collection lens 43, the assistant diffusing element 44, and the first light collection element 46 may be omitted.

In the embodiment described above, the light combiner 52 is configured to include a dichroic mirror that transmits the blue light BL but reflects the fluorescence YL to combine the blue light BL and the fluorescence YL with each other, but not necessarily, and the light combiner 52 may have any other configuration that allows combination of the blue light BL and the fluorescence YL.

In the embodiment described above, the assistant diffusing element 44 is disposed between the light collection lens 43 and the diffuser 45, but not necessarily, and the assistant diffusing element 44 may be located on the other side of the light collection lens 43, that is, the side on which the blue light BL is incident.

Further, the assistant diffusing element 44 is formed of a diffusing plate (ground glass plate) having a diffusion factor lower than that of the diffuser 45, but not necessarily, and the assistant diffusing element 44 may have any configuration that allows the blue light BL incident thereon to be diffusively outputted.

In the embodiment described above, the light source apparatus 4 includes the light collection lens 43, which serves as a superimposing element that superimposes the blue light fluxes BL emitted from the solid-state light sources SL1 in the first light source section 411 on one another on the diffuser 45, but not necessarily, and the thus configured light collection lens 43 may be omitted. Further, the light collection lens 43 does not necessarily superimpose the blue light fluxes BL emitted from the solid-state light sources SL1 on one another as long as the light collection lens 43 can collect the blue light fluxes BL and cause the collected blue light fluxes BL to be incident on the diffuser 45. Moreover, the superimposing element is not necessarily a single lens and may have a different configuration that can achieve the aforementioned function of the superimposing element.

In the embodiment described above, the first light source section 411 and the second light source section 412 are disposed side by side in the +Z direction, but not necessarily, and the second light source section 412 may be shifted with respect to the first light source section 411 toward the side opposite the side toward which the excitation light EL exits (that is, −X-direction side). It is, however, noted that the light source apparatus can be further reduced in size when the first light source section 411 and the second light source section 412 are arranged in the +Z direction because either of the light source sections does not protrude from the other light source section toward the −X-direction side.

Further, in the embodiment described above, the first light source section 411 and the second light source section 412 are integrated with each other by the radiator 413, which also functions as a support member, but not necessarily, and the radiator 413, which integrates the first light source section 411 and the second light source section 412 with each other, may be omitted. For example, the first light source section 411 and the second light source section 412 may each be provided with a radiator. Still instead, the first light source section 411 and the second light source section 412 may be integrated with each other, and the blue light outputted from the light source section 41 may be divided on the basis of the area through which the blue light passes. That is, in the single light source section, the light outputted from the area corresponding to the first light source section is used as the blue light, and the light outputted from the area corresponding to the second light source section may be used as the excitation light.

In the embodiment described above, the afocal optical apparatus 47 including the first lens 471 and the second lens 472 is disposed on the optical path of the excitation light EL. Further, the second light collection element 50 (excitation light collection element), which not only collects the parallelized light having exited out of the afocal optical apparatus 47 and causes the collected, parallelized light to be incident on the wavelength converter 51 but parallelizes the fluorescence YL emitted from the wavelength converter 51, is disposed on the optical path of the excitation light EL. The afocal optical apparatus 47 and the second light collection element 50 may, however, be omitted. For example, in the light source apparatus 4, the reflection member 48 may have the function of parallelizing the excitation light EL incident thereon in place of the second lens 472. It is, however, noted that in consideration of the efficiency of the incidence of the excitation light EL on the wavelength converter 51 and the efficiency of use of the emitted fluorescence YL, it is preferable to employ the configuration in which the second light collection element 50 is disposed on the light incident side of the wavelength converter 51, that is, the side on which the excitation light EL is incident.

In the embodiment described above, the diffusing element 49, which replaces the homogenizer optical apparatus described above, is disposed on the third illumination optical axis Ax3 and between the second lens 472 and the light combiner 52, but not necessarily. The diffusing element 49 may be omitted, and the homogenizer optical apparatus described above may be disposed in place of the diffusing element 49. Further, the diffusing element 49 may even be omitted.

In the embodiment described above, the number of solid-state light sources SL2 provided in the second light source section 412 is greater than the number of solid-state light sources SL1 provided in the first light source section 411, and the amount of the excitation light EL outputted from the second light source section 412 is therefore greater than the amount of the blue light BL outputted from the first light source section 411, but not necessarily, and the number of solid-state light sources provided in the first light source section 411 may be equal to the number of solid-state light sources provided in the second light source section 412, or the former may be greater than the latter. In this case, for example, the control apparatus 6 may adjust the amount of the blue light BL outputted from the first light source section 411 and the amount of the excitation light EL outputted from the second light source section 412.

In the embodiment described above, the projector 1 includes the light modulators 343 (343R, 343G, and 343B), each of which includes a liquid crystal panel, but not necessarily, and the invention is also applicable to a projector including two or fewer or four or more light modulators.

Further, in the embodiment described above, the image projection apparatus 3 has the configuration in which the optical parts described above are arranged in the layout shown in FIG. 2, but not necessarily. The layout can be changed as appropriate in the image projection apparatus 3, and part of the optical parts may be omitted.

In the embodiment described above, the light modulators 343 are each configured to include a transmissive liquid crystal panel having a light incident surface and a light exiting surface separately from each other, but not necessarily, and may be configured to include a reflective liquid crystal panel having a single surface that serves as both the light incident surface and the light exiting surface. Further, a light modulator using any component other than a liquid-crystal-based component and capable of modulating an incident light flux to form an image according to image information, such as a device using micromirrors, for example, a DMD (digital micromirror device), may be employed.

In the embodiment described above, the projection optical apparatus 35 is configured to include the aspheric mirror 352, which is disposed in the most downstream position of the optical path in the projection optical apparatus 35 and deflects the image light incident through the plurality of lenses 351, but not necessarily, and the projection optical apparatus 35 may not include the aspheric mirror 352. That is, the projection optical apparatus 35 may be configured to project the image light incident along the optical axis of the lenses 351 (optical axis along −Z direction) in such away that the projected image light travels along the same optical axis.

In the embodiment described above, the case where the light source apparatus 4 according to the embodiment of the invention is used in a projector is presented by way of example, but not necessarily. For example, the light source apparatus according to the embodiment of the invention may be used in a lighting apparatus, a headlight of an automobile, and other apparatus.

The entire disclosure of Japanese Patent Application No. 2017-016875, filed Feb. 1, 2017 is expressly incorporated by reference herein.

What is claimed is:

1. A light source apparatus comprising:
   a first light source section that outputs blue light along a first illumination optical axis;
   a second light source section that is so disposed that the first light source section and the second light source section are arranged side by side and outputs excitation light along a second illumination optical axis substantially parallel to the first illumination optical axis;
   a reflection member that reflects the excitation light outputted from the second light source section in such a way that the reflected excitation light travels along a third illumination optical axis that intersects the first illumination optical axis and the second illumination optical axis;
   a wavelength converter on which the excitation light reflected off the reflection member is incident after the excitation light intersects the first illumination optical axis and which causes converted light having a wavelength different from a wavelength of the excitation light to exit in a direction opposite a direction in which the excitation light is incident; and
   a light combiner that is located in a position where the first illumination optical axis and the third illumination optical axis intersect each other and transmits the blue light and the excitation light but reflects the converted light in such way that the reflected, converted light travels along the first illumination optical axis.

2. The light source apparatus according to claim 1, further comprising:
   a first lens that is disposed between the second light source section and the reflection member and collects the excitation light outputted from the second light source section;
   a second lens that is disposed between the reflection member and the light combiner and parallelizes the excitation light reflected off the reflection member; and
   an excitation light collection element that is disposed between the light combiner and the wavelength converter, collects the excitation light and causes the collected excitation light to be incident on the wavelength converter, parallelizes the converted light incident from the wavelength converter, and causes the converted light to be incident on the light combiner.

3. The light source apparatus according to claim 2, further comprising a diffusing element that is disposed between the second lens and the light combiner and diffuses the excitation light incident on the diffusing element.

4. The light source apparatus according to claim 1, further comprising a diffuser that is disposed between the first light source section and the light combiner and diffuses the blue light outputted from the first light source section.

5. The light source apparatus according to claim 4, wherein the first light source section includes a plurality of solid-state light sources each of which emits the blue light,
   the light source apparatus further includes a superimposing element that is disposed between the first light source section and the diffuser and superimposes the blue light fluxes emitted from the plurality of solid-state light sources on one another on the diffuser, and
   the superimposing element is formed of a single lens.

6. The light source apparatus according to claim 4, further comprising a parallelizing element that is disposed between the diffuser and the light combiner, parallelizes the blue light outputted from the diffuser, and causes the blue light to be incident on the light combiner.

7. The light source apparatus according to claim 1, wherein the light combiner transmits the blue light and the excitation light but reflects the converted light based on a wavelength of light incident on the light combiner.

8. The light source apparatus according to claim 1, wherein the first light source section and the second light source section are disposed with a gap therebetween.

9. The light source apparatus according to claim 8, further comprising a radiator connected to the first light source section and the second light source section.

10. The light source apparatus according to claim 1, wherein the first light source section includes blue solid-state light sources each of which emits the blue light,
the second light source section includes excitation solid-state light sources each of which emits the excitation light, and
the number of excitation solid-state light sources is greater than the number of blue solid-state light sources.

11. A projector comprising:
the light source apparatus according to claim 1;
a light modulator that modulates light outputted from the light source apparatus; and
a projection optical apparatus that projects the modulated light from the light modulator.

12. A projector comprising:
the light source apparatus according to claim 2;
a light modulator that modulates light outputted from the light source apparatus; and
a projection optical apparatus that projects the modulated light from the light modulator.

13. A projector comprising:
the light source apparatus according to claim 3;
a light modulator that modulates light outputted from the light source apparatus; and
a projection optical apparatus that projects the modulated light from the light modulator.

14. A projector comprising:
the light source apparatus according to claim 4;
a light modulator that modulates light outputted from the light source apparatus; and
a projection optical apparatus that projects the modulated light from the light modulator.

15. A projector comprising:
the light source apparatus according to claim 5;
a light modulator that modulates light outputted from the light source apparatus; and
a projection optical apparatus that projects the modulated light from the light modulator.

16. A projector comprising:
the light source apparatus according to claim 6;
a light modulator that modulates light outputted from the light source apparatus; and
a projection optical apparatus that projects the modulated light from the light modulator.

17. A projector comprising:
the light source apparatus according to claim 7;
a light modulator that modulates light outputted from the light source apparatus; and
a projection optical apparatus that projects the modulated light from the light modulator.

18. A projector comprising:
the light source apparatus according to claim 8;
a light modulator that modulates light outputted from the light source apparatus; and
a projection optical apparatus that projects the modulated light from the light modulator.

19. A projector comprising:
the light source apparatus according to claim 9;
a light modulator that modulates light outputted from the light source apparatus; and
a projection optical apparatus that projects the modulated light from the light modulator.

20. A projector comprising:
the light source apparatus according to claim 10;
a light modulator that modulates light outputted from the light source apparatus; and
a projection optical apparatus that projects the modulated light from the light modulator.

* * * * *